United States Patent [19]
Muller et al.

[11] Patent Number: 6,119,196
[45] Date of Patent: Sep. 12, 2000

[54] SYSTEM HAVING MULTIPLE ARBITRATING LEVELS FOR ARBITRATING ACCESS TO A SHARED MEMORY BY NETWORK PORTS OPERATING AT DIFFERENT DATA RATES

[75] Inventors: Shimon Muller, Sunnyvale; Binh Pham, Castro Valley; Curt Berg, Los Altos, all of Calif.

[73] Assignee: Sun Microsystems, Inc., Mountain View, Calif.

[21] Appl. No.: 08/884,764

[22] Filed: Jun. 30, 1997

[51] Int. Cl.$^7$ ...................................................... G06F 13/00
[52] U.S. Cl. ............................................. 710/243; 710/240
[58] Field of Search ............................. 370/429; 710/243, 710/240

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/468 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/429 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/732 |
| 5,309,437 | 5/1994 | Perlman et al. | 340/827 |
| 5,313,454 | 5/1994 | Bustini et al. | 370/13 |

(List continued on next page.)

OTHER PUBLICATIONS

Wang et al., A Novel Message Switch for Highly Parallel Systems, IEEE, pp. 150–155, 1989.
Tobagi, Fast Packet SwitchArchitectures for Broadband Integrated Services Digital Networks, Proceedings of the IEEE, vol. 78, Issue 1, pp. 133–167, Jan. 1990.
Fliesser et al., Design of a Multicast ATM Packet Switch, Electrical and Computer Engineering, 1993 Canadian Conference, pp. 779–783, 1993.
Chang et al., An Overview of the Pipelined Common Buffer Architecture (PCBA) for Memory Based Packet/Cell Switching Systems, Local Computer Networks, 1994, pp. 288–297, 19th Conference, IEEE.
Agrawal et al., A Scalable Shared Buffer ATM Switch Architecture, VLSI, 1995 5th Great Lakes Symposium, IEEE, pp. 256–261, 1994.

(List continued on next page.)

*Primary Examiner*—Le Hien Luu
*Attorney, Agent, or Firm*—Blakely Sokoloff Taylor & Zafman

[57] ABSTRACT

A method and apparatus for managing a buffer memory in a packet switch that is shared between multiple ports in a network system. The apparatus comprises a plurality of slow data port interfaces configured to transmit data at a first data rate between a slow data port and the buffer memory and a plurality of fast data port interfaces configured to transmit data at a second data rate between a fast data port and the buffer memory. A first level arbiter is coupled to the plurality of slow data port interfaces. The first level arbiter chooses an access request of one the slow data ports and outputs the access request. A second level arbiter is coupled to the plurality of fast data port interfaces and to the output of the first level arbiter. The second level arbiter chooses an access request from among a plurality access requests from the fast data port interfaces and the access request from the first level arbiter, and forwards the chosen access request to the memory.

16 Claims, 8 Drawing Sheets

U.S. PATENT DOCUMENTS

| | | | |
|---|---|---|---|
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |
| 5,394,402 | 2/1995 | Ross | 370/94.1 |
| 5,396,602 | 3/1995 | Amini et al. | 395/293 |
| 5,402,415 | 3/1995 | Turner | 370/60 |
| 5,404,538 | 4/1995 | Krappweis, Sr. | 395/737 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazzo, Jr. et al. | 395/200.79 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,624 | 10/1995 | Mazzola | 370/402 |
| 5,473,607 | 12/1995 | Hausman | 370/85.13 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmaer et al. | 395/600 |
| 5,561,666 | 10/1996 | Christensen et al. | 370/434 |
| 5,561,791 | 10/1996 | Mendelson et al. | 395/550 |
| 5,566,170 | 10/1996 | Bakke et al. | 370/60 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/468 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,500 | 4/1997 | Hiekali | 370/414 |
| 5,619,661 | 4/1997 | Crews et al. | 395/299 |
| 5,633,710 | 5/1997 | Mandal et al. | 364/514 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,358 | 3/1998 | Headrick et al. | 370/418 |
| 5,726,977 | 3/1998 | Lee | 370/235 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,764,634 | 6/1998 | Christensen et al. | 370/401 |
| 5,764,636 | 6/1998 | Edsall et al. | 370/401 |
| 5,781,549 | 7/1998 | Dai | 370/398 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,822,319 | 10/1998 | Nagami et al. | 370/392 |
| 5,825,767 | 10/1998 | Mizukoshi et al. | 370/395 |
| 5,835,491 | 11/1998 | Davis et al. | 370/386 |
| 5,838,677 | 11/1998 | Kozaki et al. | 370/389 |
| 5,856,977 | 1/1999 | Yang et al. | 370/411 |
| 5,859,849 | 1/1999 | Parks | 370/395 |
| 5,872,783 | 2/1999 | Chin | 370/395 |
| 5,875,464 | 2/1999 | Kirk | 711/129 |
| 5,931,980 | 8/1999 | Varma et al. | 370/395 |

OTHER PUBLICATIONS

Sabaa et al., Implementation of a Window–Based Scheduler in an ATM Switch, Electrical and Computer Engineering, 1995 Canadian Conference, IEEE, pp. 32–35, 1995.

Naraghi–Pour et al., A Multiple Shared Memory Switch, System Theory, 1996 Southeastern Symposium, IEEE, pp. 50–54 1996.

Iyengar et al., Switching Prioritized Packets, GLOBECOM '89: IEEE Global Telecommunications Conference, pp. 1181–1186, 1989.

Load Balancing for Multiple Interfaces for Transmission Control Protocol/Internet Protocol for VM/MVS, IBM Technical Disclosure Bulletin, 38(9):7–9 (Sep., 1995).

T. Nishizono et al., "Analysis on a Multilink Packet Transmission System", Electron. Commun. JPN 1, Commun., (USA), 68(9):98–104 (Sep., 1985).

International Search Report, PCT/US 98/13015.

International Search Report, PCT/US 98/13200.

International Search Report, PCT/US 98/13202.

International Search Report, PCT/US 98/13203.

International Search Report, PCT/US 98/13206.

International Search Report, PCT/US 98/13361.

International Search Report, PCT/US 98/13362.

International Search Report, PCT/US 98/13380.

"Foundry Products", downloaded from Website http://www.foundrynet.com/ on Jun. 19, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from website http://wwwbaynetworks.com on Apr. 18, 1997.

International Search Report, PCT/US98/13368, 5 pages.

International Search Report, PCT/US98/13364, 4 pages.

International Search Report, PCT/US98/13365, 4 pages.

International Search Report, PCT/US98/13177, 4 pages.

International Search Report, PCT/US98/13199, 5 pages.

SYSTEM HAVING MULTIPLE ARBITRATING LEVELS FOR ARBITRATING ACCESS TO A SHARED MEMORY BY NETWORK PORTS OPERATING AT DIFFERENT DATA RATES

FIELD OF THE INVENTION

The invention is in the field of packet routing switches in networked computing environments.

BACKGROUND OF THE INVENTION

Computer networks allow multiple processors to communicate with each other. A computer network may link various types of computers and memory devices. Data is typically transferred between components on a network in packets. Packets are usually groups of data words each of a certain length. As networks become larger and more complex, it becomes increasingly important to be able to route and store packets efficiently. Packets are often temporarily stored during the process of routing from one network component to another network component. This is partially due to the random nature of the input and output port traffic distribution, as well as rate adaptation between ports that transfer data at different rates. Thus, packet storage, or buffering, is an integral part of the switching function. Buffering may occur in a memory that is part of a switch circuit (on the same die as the switch circuit) or on a memory that is separate from the switch circuit. A buffer memory may be associated with one port or shared between several ports.

When data packets are stored during routing it is important to provide fast and efficient access to the storage device, or memory, so that memory access does not become a source of delay and, therefore, of network performance degradation. Network switches are devices that handle routing and storage of packets between network components. Network switches include input ports and output ports for connection to multiple network components transmitting data to and receiving data from the switch. The network components using the switch are known as clients of the switch. A single switch may use a single memory device to store data from multiple clients that transmit data at different rates. It is important for a network switch to handle memory access by multiple clients of different data rate capabilities in such a way as to maximize memory bandwidth. The need to maximize memory bandwidth, however, must compete with other concerns when a network switch architecture is designed. For example, providing a wider data path from clients to the buffer memory would improve memory bandwidth, but only at the cost of extra hardware and additional interconnect. Trade-offs, therefore, must be made in designing a switch architecture so that it functions efficiently, economically, and flexibly.

SUMMARY OF THE INVENTION

A method and apparatus for managing a buffer memory in a packet switch that is shared between multiple ports in a network system. The apparatus comprises a plurality of slow data port interfaces configured to transmit data at a first data rate between a slow data port and the buffer memory and a plurality of fast data port interfaces configured to transmit data at a second data rate between a fast data port and the buffer memory. A first level arbiter is coupled to the plurality of slow data port interfaces. The first level arbiter chooses an access request of one of the slow data ports and outputs the access request. A second level arbiter is coupled to the plurality of fast data port interfaces and to the output of the first level arbiter. The second level arbiter chooses an access request from among a plurality access requests from the fast data port interfaces and the access request from the first level arbiter, and forwards the chosen access request to the memory.

DETAILED DESCRIPTION

A memory controller that allows access to a shared buffer memory by network clients is described. In one embodiment, a buffer memory controller (BMC) resides on a switch element die and maximizes bandwidth of a shared memory device, in part by providing separate interfaces for ports that transmit data at different data rates. Memory bandwidth is further optimized through pipelining of data handling within the buffer memory controller, and by efficient scheduling of read and write operations to the shared buffer memory.

Figure 1:
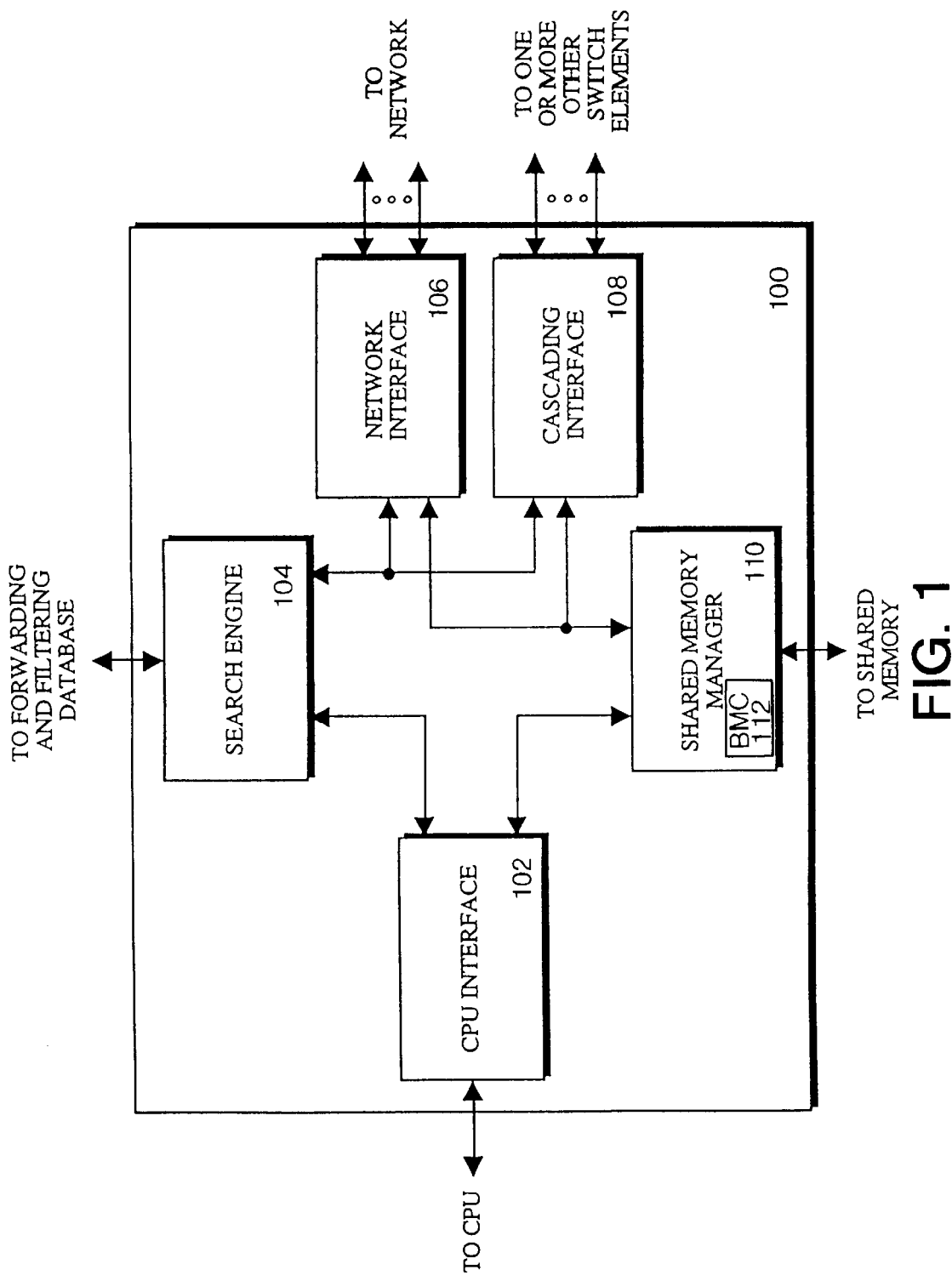
FIG. 1 is a block diagram of a network switch element including a memory controller according to one embodiment of the present invention.

FIG. 1 is a simplified block diagram illustrating an architecture of a switch element according to one embodiment of the present invention. Switch element 100 includes a central processing unit (CPU) interface 102, a network interface 106, a cascading interface 108, and a shared memory manager 110. Shared memory manager 110 includes shared buffer memory controller (BMC) 112.

Ethernet packets may enter or leave switch element 100 through any one of the three interfaces 106, 102, or 108. In brief, the network interface 106 operates, according to this embodiment, in accordance with the Ethernet protocol to receive Ethernet packets from a network (not shown) and to transmit Ethernet packets onto the network via one or more external ports (not shown). An optional cascading interface 108 may include one or more internal links (not shown) for interconnecting switching elements to create larger switches.

The CPU may transmit commands or packets to the switch element 100 via the CPU interface 102. In this manner, one or more software processes running on the CPU may manage entries in an external forwarding and filtering database (not shown), such as adding new entries and invalidating unwanted entries. In alternative embodiments, however, the CPU may be provided with direct access to a forwarding and filtering database. In any event, for purposes of packet forwarding, the CPU port of the CPU interface 102 resembles a generic input/output port into the switch element 100 and may be treated as if it were simply another external network interface port.

The network interface 106, the CPU interface 102, and the cascading interface 108 are coupled to the shared memory manager 110. The shared memory manager 110 provides an efficient centralized interface to the external shared memory for buffering of incoming packets.

In the present embodiment, Ethernet packets are centrally buffered and managed by the shared memory manager 110. Shared memory manager 110 interfaces every input port and output port and performs dynamic memory allocation and deallocation, respectively, on their behalf. During input packet processing, one or more buffers are allocated in the external shared memory and an incoming packet is stored by the shared memory manager 110 responsive, for example, to commands received from the network interface 106. Subsequently, during output packet processing, the shared memory manager 110 retrieves the packet from the external shared memory and deallocates buffers that are no longer in use. To assure that no buffers are released until all output ports have completed transmission of the data stored therein, the shared memory manager 110 preferably also tracks buffer ownership.

The present invention may be included in a switch element such as switch element 100 which provides wire speed routing and forwarding of Fast Ethernet and Gigabit Ethernet packets. However, it is contemplated that the interfaces may be configured to conform with other network protocols as well. Also, it is appreciated that functions may be partitioned differently than as described above. For example, multiple units may perform the dynamic allocation, deallocation, and tracking that is associated with shared memory manager 110 in the embodiment depicted. Further, while the switch element is preferably highly integrated and comprises a single application specific integrated circuit (ASIC) that implements performance-critical functions in hardware, alternative embodiments may include a chip set comprising two or more ASICs. Finally, it is appreciated that the partitioning of functionality between hardware and software may be modified as well.

Figure 2:
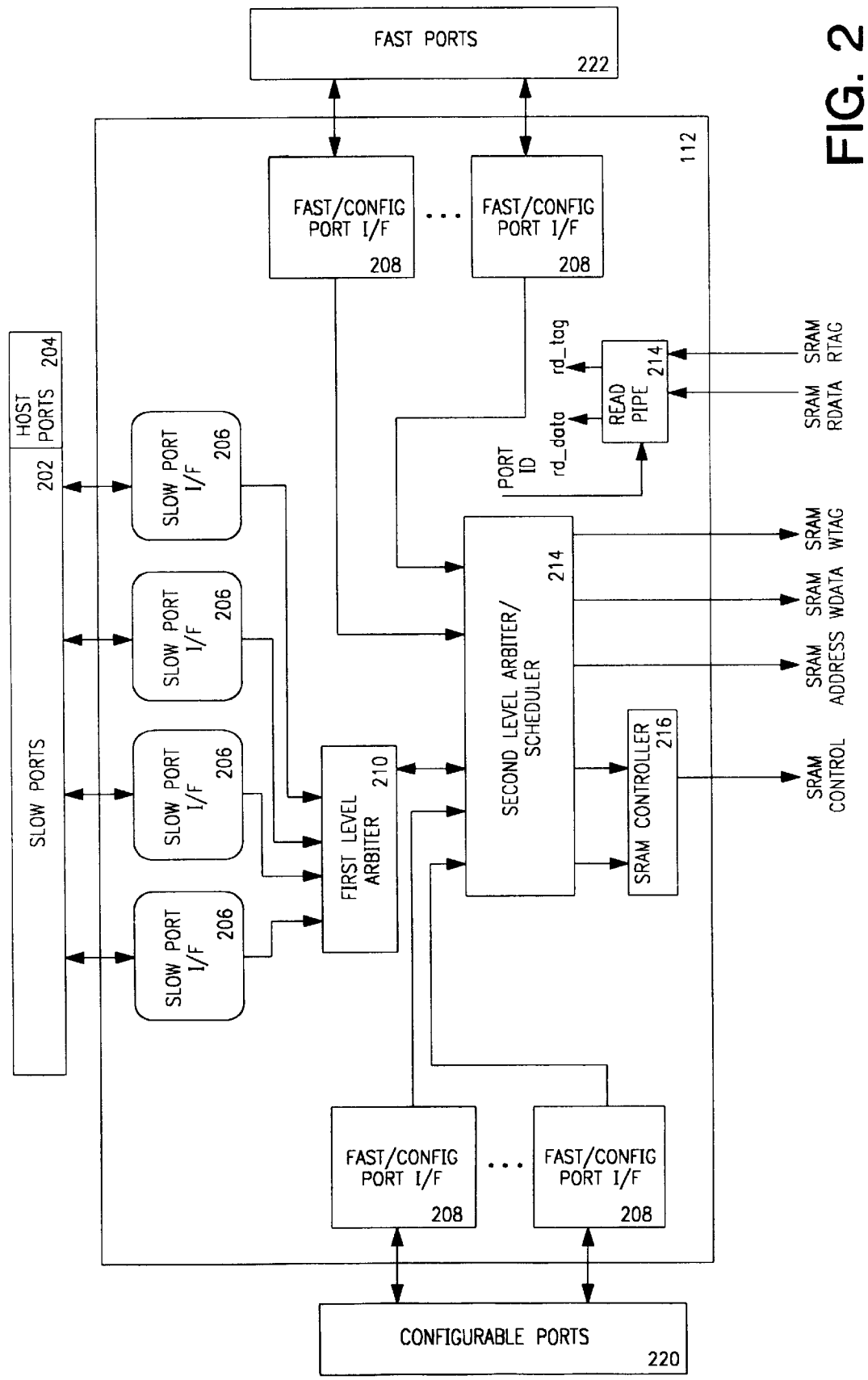
FIG. 2 is a block diagram of a shared buffer memory controller (BMC) according to one embodiment of the present invention.

FIG. 2 is a block diagram of buffer memory controller (BMC) 112 according to one embodiment. BMC 112 controls access to a shared SRAM memory (not shown) for a variety of ports in a network computer system. BMC 112 controls access to a shared memory for slow ports 202 which operate at a relatively slow data rate as compared to other ports in the network. Host devices also access the shared memory through host port 204 of BMC 112, usually over a local bus such as a peripheral component interface (PCI) bus. Fast ports 222 also access the shared memory through BMC 112. Fast ports 222 operate at a relatively fast data rate as compared to slow ports 202. Configurable ports 220 access the shared memory through BMC 112. Configurable ports 220 are ports which can be configured to operate at the data rate of slow ports 202 or at the data rate of fast ports 222. According to one embodiment of the present invention, slow port 202 operate in compliance with Ethernet protocol or Fast Ethernet protocol. In one embodiment, host port 204 complies with the PCI bus protocol. According to this embodiment, fast ports 222 operate in compliance with a gigabit Ethernet protocol. The Fast Ethernet rate of slow ports 202 is 100 Mbps. In one embodiment, bandwidth of 100 Mbps is allocated for host port 204. The data rate of gigabit fast ports 222 is ten times the data rate of Fast Ethernet slow ports 202 and host port 204. In one embodiment of the present invention, BMC 112 is connected to three fast (gigabit) ports, five programmable ports, eleven slow (Fast Ethernet) ports, and one host port.

BMC 112 includes slow port interfaces 206 and fast/configurable port interfaces 208. As will be explained in more detail below, BMC 112 handles transactions between ports operating at different data rates (in this embodiment, gigabit ports and Fast Ethernet ports) differently so as to maximize the bandwidth of the shared memory device. One aspect of this bandwidth maximization is two level arbitration as shown in FIG. 2. Specifically, slow port interfaces 206 can access the shared memory only after an access request passes through first level arbiter 210 and second level arbiter/scheduler 214. Port interfaces that are capable of operating at the gigabit rate, such as fast/configurable port interfaces 208 access the shared memory device through second level arbiter/scheduler 214. Second level arbiter/scheduler 214 arbitrates among requests for access to the shared memory and passes control signals to SRAM controller 216. When an interface port is granted access to a shared memory second level arbiter/scheduler 214 transmits SRAM addresses, write data (WDATA), and write tag (WTAG) information for storage in the shared memory device. Read pipe 218 facilitates reads from the shared memory device by temporarily storing a port identification that allows the proper port to receive read data (rd_data) and read tag (rd_tag) information from the shared memory device.

Figure 3:
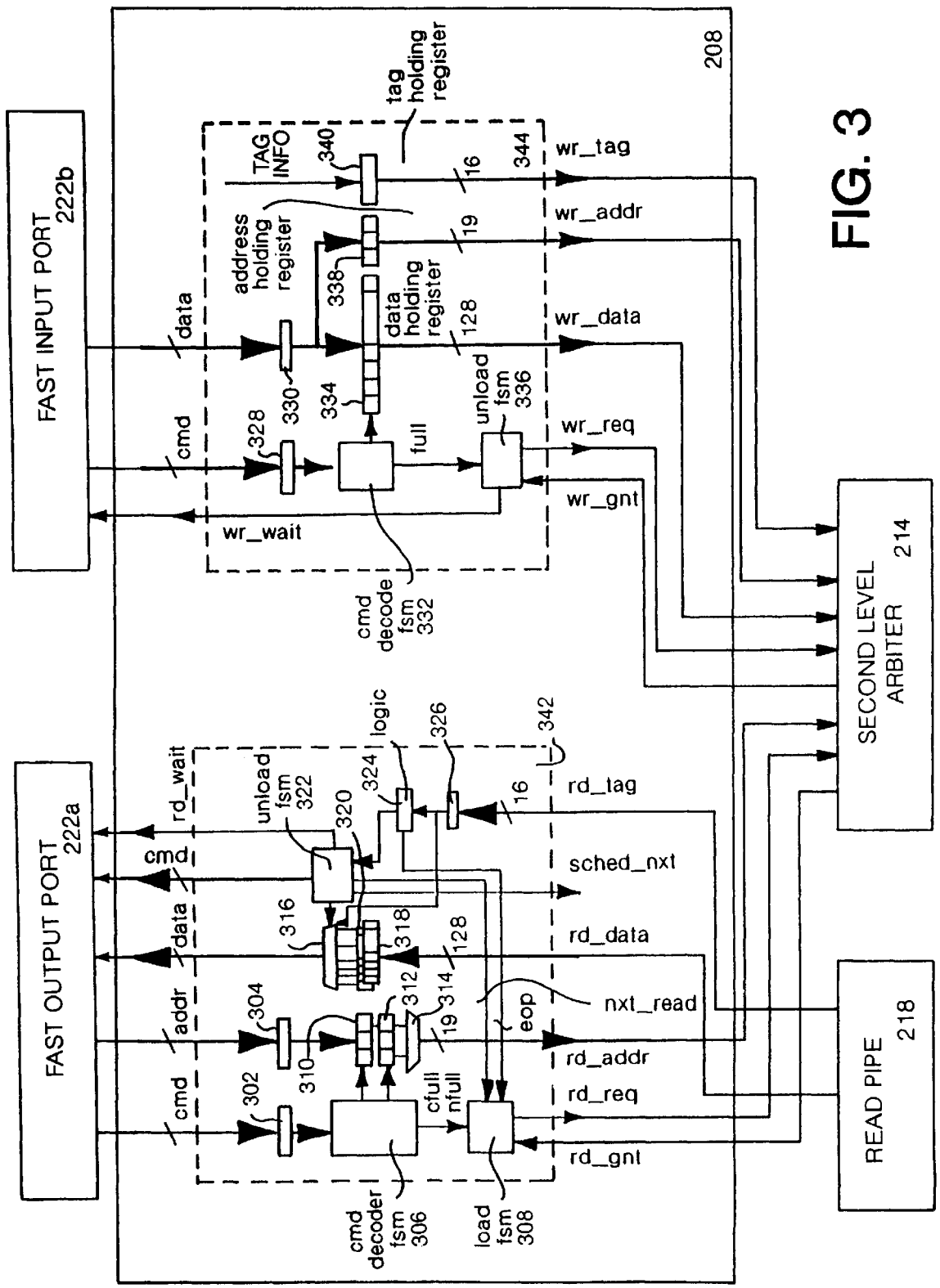
FIG. 3 is a block diagram of a fast/configurable port interface according to one embodiment of the present invention.

FIG. 3 is a block diagram showing one fast port 222 connected to one fast/configurable port interface 208. Fast/configurable port interface 208 is in turn coupled to read pipe 218 and second level arbiter/scheduler 214. The fast port shown includes fast output port 222a and fast input port 222b. As shown, output port 222a is coupled to output interface circuitry 342, and fast input port 222b is coupled to fast input interface circuitry 344. Fast input port 222b and fast output port 222a communicate with fast/configurable port interface 208 of BMC 112 via their own command, address, and data busses. Fast input interface circuitry 344 performs only write operations to the shared memory, and output interface circuitry 342 performs only read operations to the shared memory.

When a network client connected to fast input port 222b requests a write operation to the shared memory, fast input port 222b transfers data, address, and tag information in 16-bit segments across data lines to register 330 as shown. In this embodiment three command bits are also sent to register 328. Registers 328 and 330 are included in fast input interface circuitry 344 for synchronization purposes. In this embodiment data is written to and stored in the shared memory in 128-bit words. Through the use of command bits, according to the present invention, a much narrower physical interface between clients and the shared memory, in this embodiment, 16-bit instead of 128-bit, is achieved. This allows for much less connection hardware and still preserves efficient memory access. Three command bits direct 16-bit segments of data entering fast input interface circuitry 344 to data holding register 334, address holding register 338 and tag holding register 340. Three command bits are encoded in fast input port 222b and decoded and command decoder finite state machine (fsm) 332. According to one embodiment, the command bits can be decoded to indicate no operation, write first address, write second address, write first data, wr_data, write last word of a packet, or write status. According to this embodiment, fast input port 222b sends two wr_addr commands to BMC 112 to form a 19-bit address. Fast input port 222b then sends a write first data command to send the first 16-bit data segment on the data bus to fast input interface circuitry 344. This data is stored in data holding register 334 which is a 16-byte register. Fast input port 222b continues to send seven additional data wr_cmd signals until holding register 334 is filled. A wr_req is then generated and sent to second level arbiter/scheduler 214. At the same time, a write wait (wr_wait) signal is sent to fast interface port 222b indicating that the holding register is busy and cannot take any more data. The wr_wait signal is generated by unload fsm 336 from a "full" signal received from command decoder fsm 332 and a write grant (wr_gnt) signal from second level arbiter 214.

Second level arbiter/scheduler 214, in this embodiment, uses a round robin arbitration scheme to grant access to fast input port 222b. Second level arbiter/scheduler 214 also schedules the address, data and tag to be written into the shared memory device. Address and data are then written into the memory in the following clock cycle. In the preferred embodiment, SRAM technology is used. Since the SRAM technology used is fully pipelined, arbiter/scheduler 214 can schedule back-to-back write operations. When the end of a packet of data is reached, fast input port 222b sends a write status command to fast input interface circuitry 344 along with the status information. The last data and status to be written into the packet memory is then scheduled by fast input interface circuitry 344.

Output interface circuitry 342 controls access to the shared memory by fast output port 222a for read operations from the shared memory. When a network client connected to fast output port 222a requires a read access to the shared memory fast output port 222a formulates command and address bits to be sent to registers 302 and 304 respectively. Registers 302 and 304 are used for the purpose of synchronization. Three command bits enter command decoder fsm 306 and are decoded. Depending upon the decoded significance of the command bits, 16-bit address segments entering output port interface circuitry 342 are loaded into registers 310 or 312. One of registers 310 or 312 holds a current address and the other of the two registers holds an address of a next packet. The register holding the current address is incremented for each address of the current packet being written to the memory. The first address of the next packet is held available in the other register so that no latency is incurred during the period between writing the last word of the current packet and the first word of the next packet. Multiplexor 314 selects the current 19-bit address stored in the appropriate register 310 or 312 to be sent to second level arbiter/scheduler 214 as the next read address (rd_addr). Command decoder fsm 306 sends a current full (cfull) or next full (nfull) signal, as appropriate, to load fsm 308 when the current address or next address fills registers 310 or 312. Logic 324 receives a rd_tag from the memory via register 326 of read pipe 218 which holds the rd_tag for synchronization purposes. Logic 324 uses the rd_tag to generate an end of packet (eop) signal to load fsm 308. Load fsm 308 generates a read request (rd_req) signal to second level arbiter/scheduler 214. When arbitration for access to the shared memory is complete, second level arbiter/scheduler 214 sends a read grant (rd_gnt) to load fsm 308. Unload fsm 322 coordinates the unloading of data from the shared memory through read pipe 218 to fast output port 222a. Read data from the memory is transferred in 128-bit words to one of registers 318 or 320 in parallel. One of registers 318 or 320, after being loaded in parallel from the memory, is unloaded in 16-bit segments through multiplexor 316. As directed by information from unload fsm 322 and the rd_tag, output interface circuitry 342 efficiently handles double buffering of the data from read pipe 218 so that the shared memory bandwidth can be optimized, and at the same time a narrow data interface (16-bits) to fast output port 222a is maintained. Unload fsm 332 also generates commands and rd_wait signals to fast output port 222a. The rd_wait signal functions as a flow control signal informing fast output port 222a that it must wait to send further rd_reqs until the rd_wait signal is deasserted.

Figure 4:
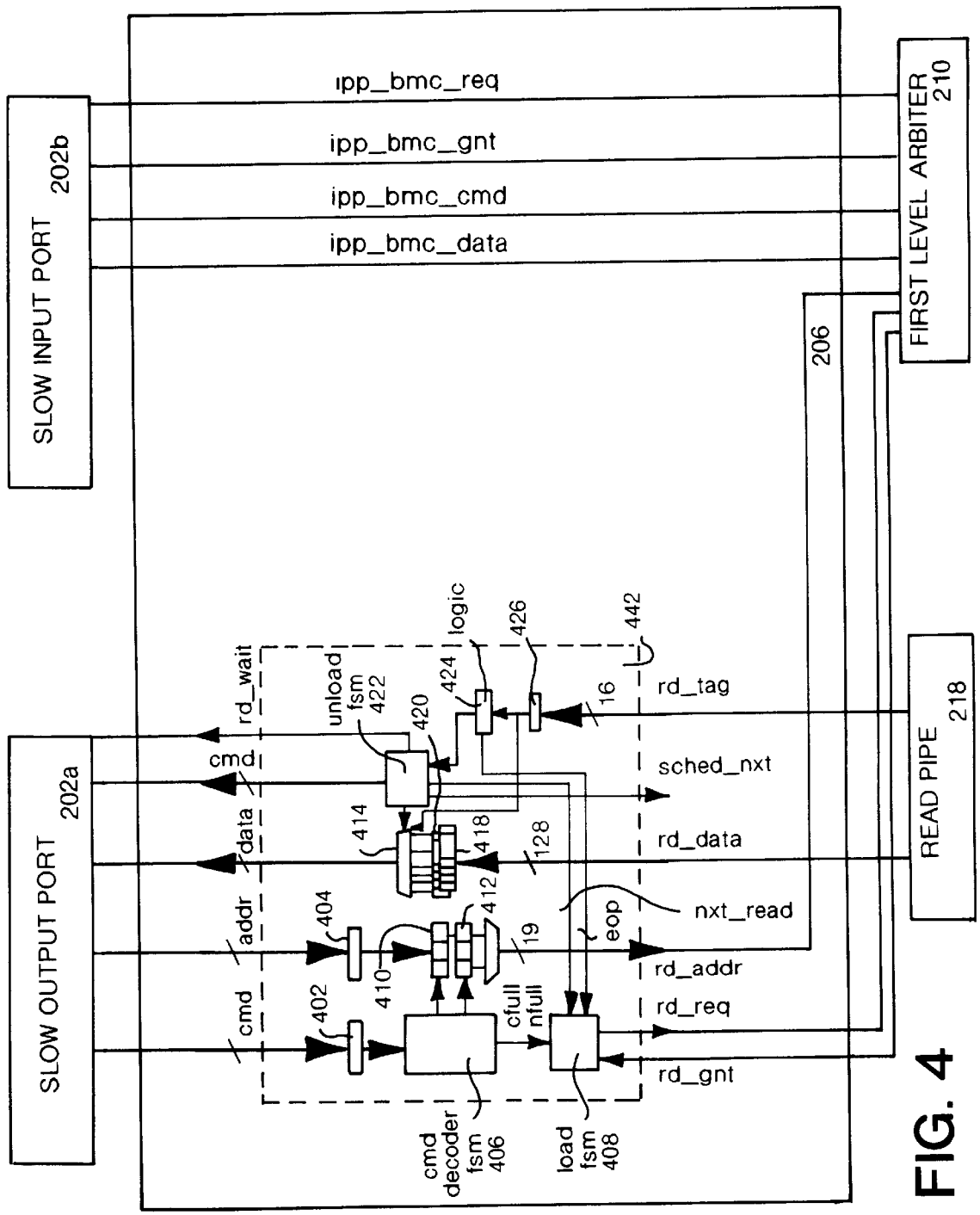
FIG. 4 is a block diagram of a slow port interface according to one embodiment of the present invention.

FIG. 4 is a block diagram of slow port interface 206. FIG. 4 shows the connection of slow port interface 206 to one of slow ports 202. Each slow port 202 has a slow output port 202a and a slow input port 202b, as shown. Slow port interface 206 also communicates with read pipe 218, and first level arbiter 210. According to the present invention, efficient access to a shared memory is granted to network clients operating at different data rates, in part because data being written to the shared memory from slow clients through a slow input port shares physical resources while wr_data through fast input ports does not share physical resources. In the embodiment described, this arrangement represents a design choice that takes advantage of the fact that the slower data can be handled just as efficiently with less dedicated hardware resources. As shown in FIG. 4, slow port interface 206 contains no buffering or control circuitry for wr_data coming through slow input port 202b. That is to say, slow port interface 206 does not possess circuitry analogous to fast input interface circuitry 344 of FIG. 3. Instead, slow client input port rd_req command and data signals are sent directly to first level arbiter 210, and wr_gnt signals are sent directly from first level arbiter 210 to slow input port 202b.

Output interface circuitry 442 operates exactly as described with respect to output interface circuitry 342 with one exception. Output interface circuitry 442 of slow port interface 206 must gain access to shared memory through two levels of arbitration rather than one. Specifically, rd_req and rd_addr signals are sent to first level arbiter 210. Rd_gnt signals are received from second level arbiter/scheduler 214 when arbitration is complete.

Figure 5:
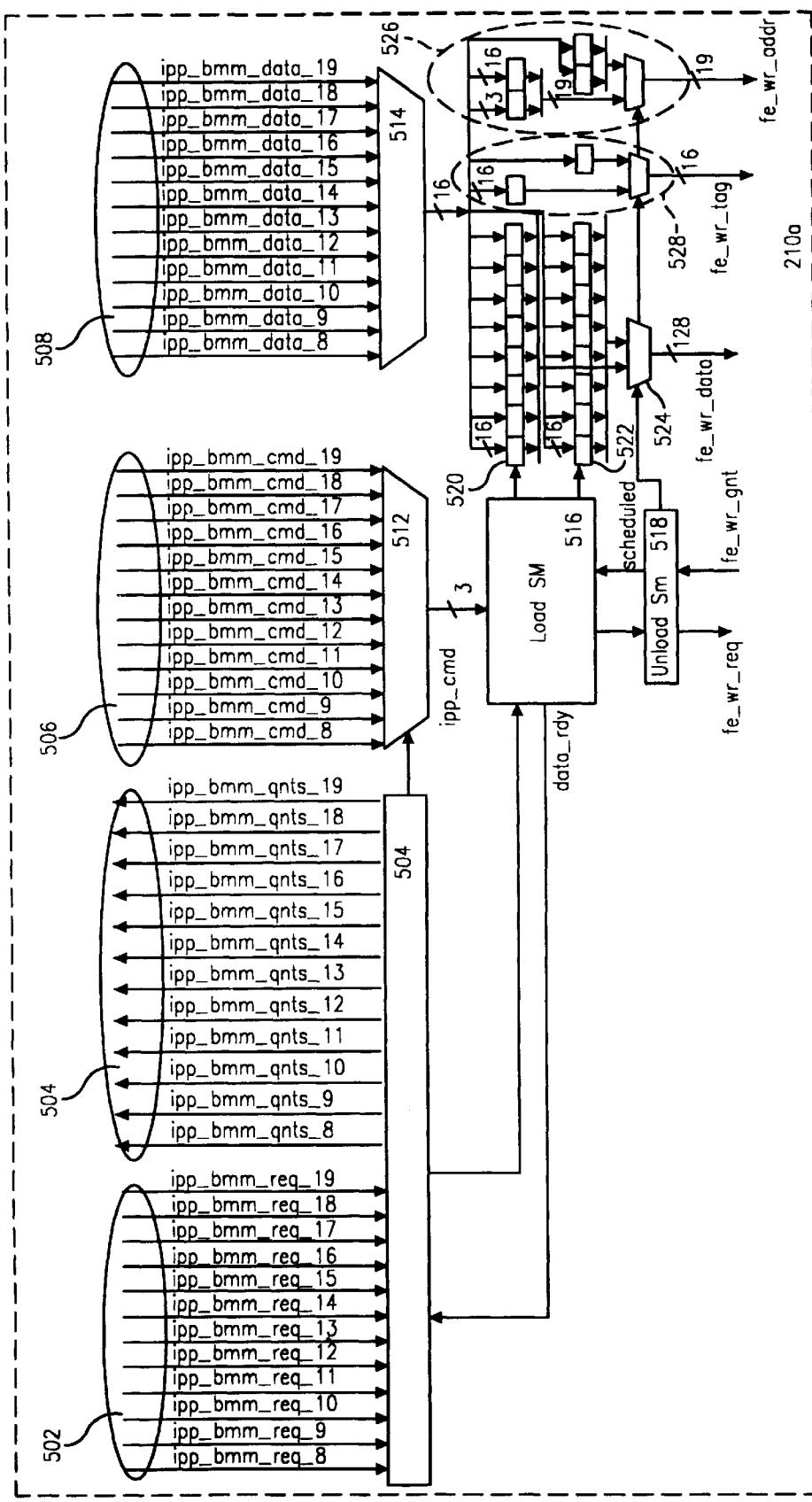
FIG. 5 is a block diagram of a write portion of a first level arbiter according to one embodiment of the present invention.

FIG. 5 is a diagram showing details of the portion of first level arbiter 210 that processes write operations to the shared memory. First level write arbiter 210a includes arbitration circuit 510, and command and data multiplexors 512 and 514, respectively. Arbitration circuit 510 receives, in this embodiment, wr_reqs from eleven ports operating at 100 Mbps. In this embodiment, arbitration circuit 510 also receives wr_reqs from one host port operating at the data rate of the 100 Mbps ports. In other embodiments, different numbers of various types of ports, operating at different data rates, and in compliance with different protocols than in the embodiments described, are serviced by arbitration circuit 510. Arbitration circuit 510 uses a round robin arbitration scheme to choose a particular port to which access will be next granted. Grant signals 504 are individual wr_gnt signals that are sent from second level arbiter/scheduler 214 through first level write arbiter 210a to individual requesting ports. Command lines 506 each originate in one slow input port and transfer command information in three bit segments to multiplexor 512. When arbitration is complete, a select signal from arbitration circuit 510 causes command information from one of the requesting slow ports to be transferred to load state machine 516. Data lines 508 each originate in one slow input port. Data lines 508 each transfer data information in 16-bit segments to multiplexor 514.

When arbitration is complete, the command information from one of the ports is transferred from multiplexor 514 by a select signal from arbitration circuit 510. Data in 16-bit segments is transferred from mux 514 to one of wr_data registers 520 or 522, or to registers 526 and 528 as directed by command bits decoded in load state machine 516. Registers 520 and 522 are used to assemble a write data (fe_wr_data) in 128-bit words. Registers 528 are used to assemble a 16-bit Fast Ethernet write tag (fe_wr_tag). Registers 526 are used to assemble a 19-bit write address (fe_wr_addr). Under the control of unload state machine 518, multiplexor 524 transmits a 128-bit data word from one of registers 520 or 522 to be written to the shared memory. Unload state machine 518 transmits a write request (fe_wr_req) to the second level arbiter/scheduler 214 and receives a write grant (fe_wr_gnt) signal from second level arbiter/scheduler 214.

Figure 6:
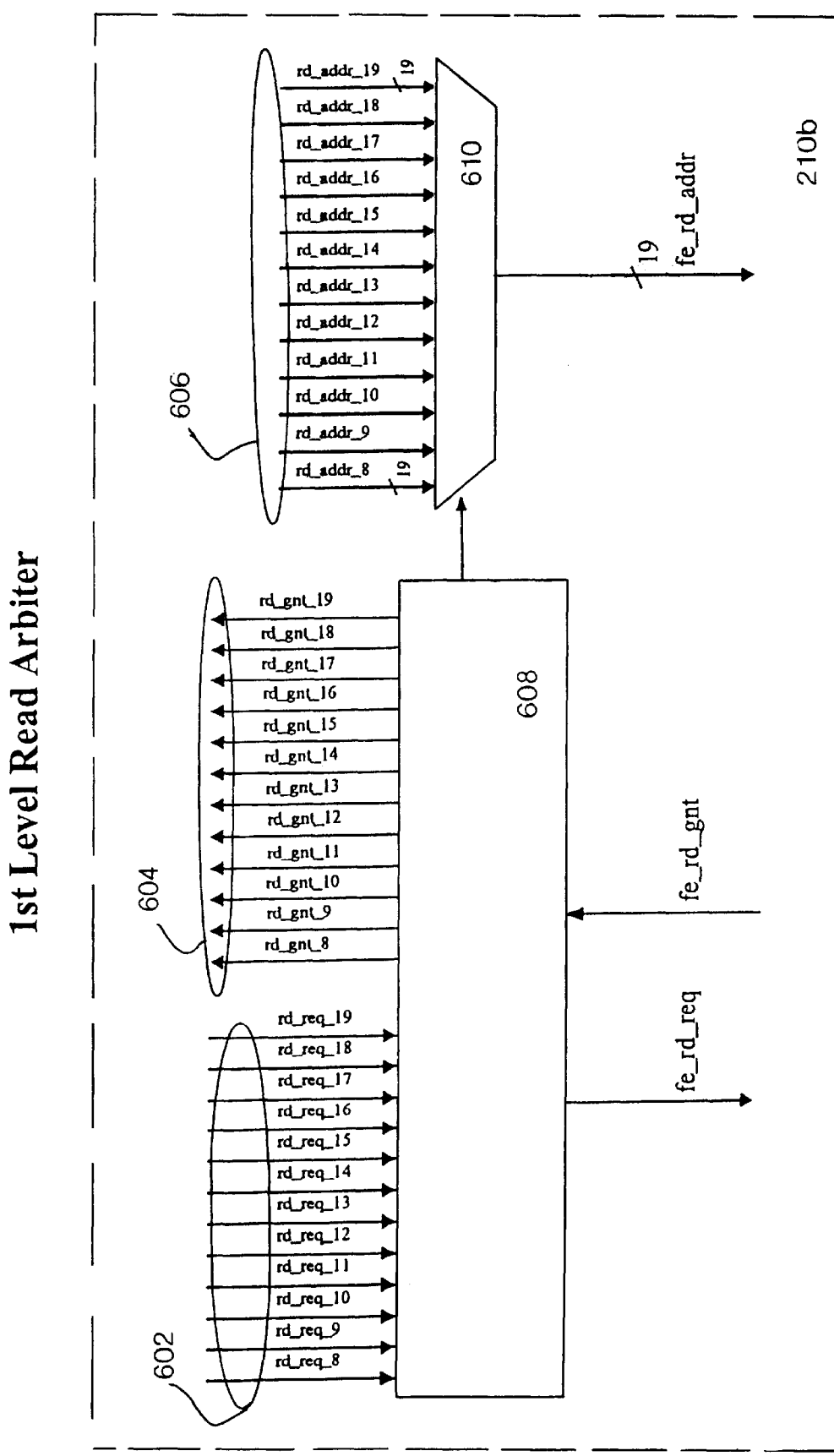
FIG. 6 is a block diagram of a read portion of a first level arbiter according to one embodiment of the present invention.

FIG. 6 is a block diagram of a read arbiter portion 210b of first level arbiter 210. First level read arbiter 210b includes arbitration circuit 608 and multiplexor 610. Read request (rd_req) lines 602 carry request signals from eleven slow (in this embodiment, Fast Ethernet) output ports and one host output port. Read grant (rd_gnt) lines 604 carry rd_gnt signals from arbitration circuit 608 to individual ports requesting a read operation. Read address (rd_addr) lines 606 carry read addresses of 19 bits from requesting ports. One 19-bit read address (fe_rd_addr) is transferred to second level arbiter/scheduler 214 by a select signal from arbitration circuit 608 to multiplexor 610. Arbitration circuit 608 transfers a single read request (fe_rd_req) from one of the requesting ports upon completing round robin arbitration. Arbitration circuit 608 receives a read grant (fe_rd_gnt) signal from second level arbiter/scheduler 214.

Figure 7:
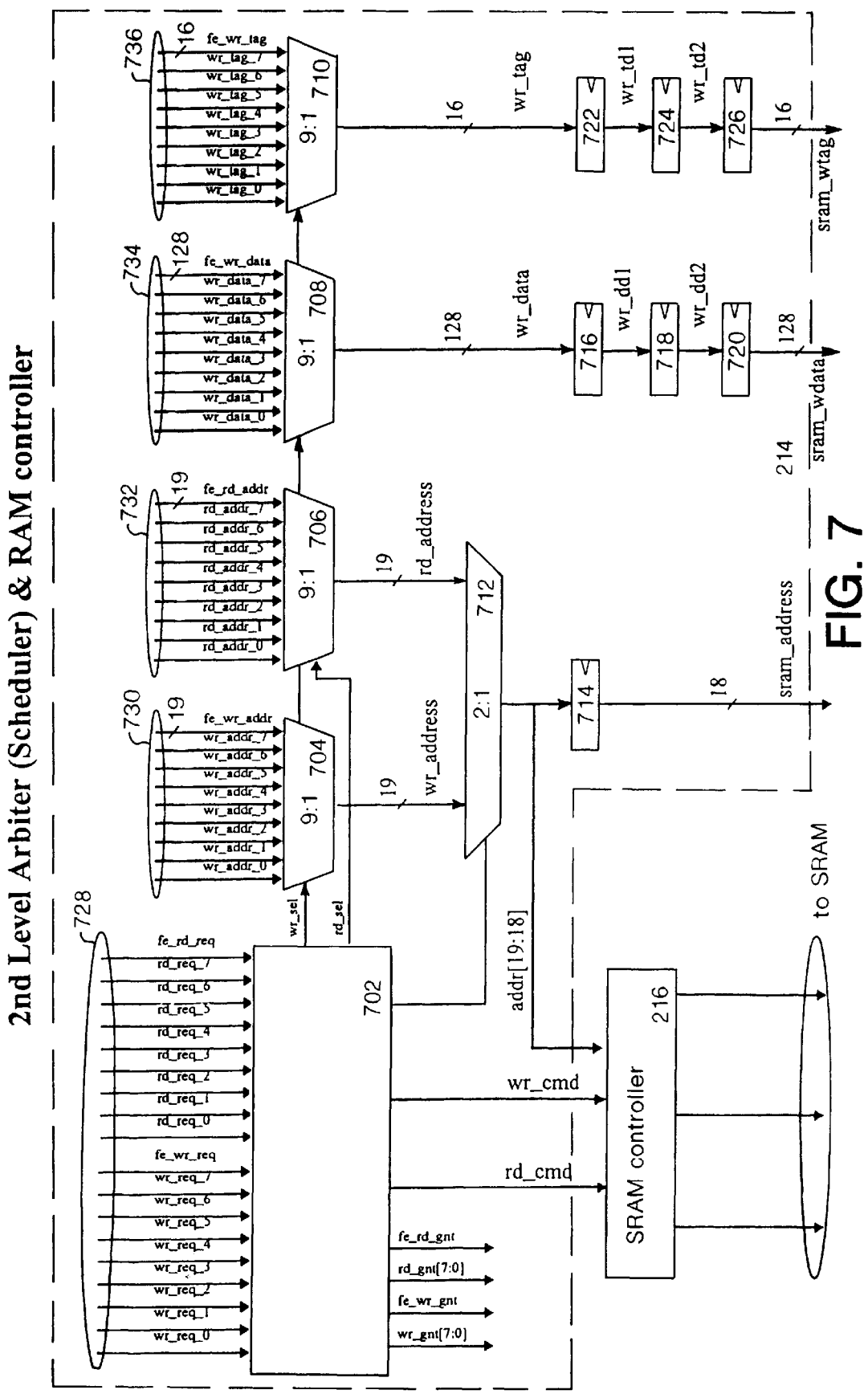
FIG. 7 is a block diagram of a second level arbiter/scheduler according to one embodiment of the present invention.

FIG. 7 is a block diagram of second level arbiter/scheduler 214. FIG. 7 also shows SRAM controller 216 coupled to second level arbiter/scheduler 214. Second level arbiter/scheduler 214 includes arbitration circuit 702 and multiplexors 704, 706, 708 and 710 for receiving wr_addrs, rd_addrs, $wr_{13}$ data, and wr_tags, respectively. Request lines 728 transmit rd_reqs and wr_reqs to arbitration circuit 702. Eight wr_req signals are sent to arbitration circuit 702. In this embodiment, the eight wr_req signals represent requests from eight fast (gigabit Ethernet) ports or three gigabit ports and five configurable ports configured as gigabit ports. One fe_wr_req signal enters arbitration circuit 702 from first level arbiter 210. Arbitration circuit 702 also receives eight read requests (rd_req) signals corresponding to the eight wr_req signals previously described. Finally arbitration circuit 702 receives one fe_rd_req from first level arbiter 210. Arbitration circuit 702 performs, in this embodiment, round robin arbitration and issues an fe_rd_gnt signal, an rd_gnt signal, an fe_wr_gnt signal, and a wr_gnt signal as appropriate. Arbitration circuit 702 further transmits a write command (wr_cmd) signal and a read command (rd_cmd) signal to SRAM controller 216 as appropriate. When arbitration is complete, arbitration circuit 702 transmits a write select (wr_sel) or read select (rd_sel) signal, as required by the current operation, to multiplexors 704, 706, 708, and 710 as shown. Wr_addr lines 730 transmit wr_addr signals and one fe_wr_addr signal to multiplexor 704.

As explained with respect to request signals 728, in the embodiments shown wr_addr signals from eight gigabit ports (transmitted directly) and one fe_ar_addr signal from first level arbiter 210 are received by multiplexor 704. Similarly, rd_addr and fe_rd_addr signals are sent to multiplexor 706 on rd_addr lines 732. Wr_data signals and fe_wr_data signals are sent to multiplexor 708 on wr_addr lines 734. Wr_tag signals and one fe_wr_tag signal are sent to multiplexor 710 on wr_tag lines 736. When arbitration is complete, multiplexor 712 selects one of a 19-bit wr_addr or a 19-bit rd_addr to transmit to register 714 and SRAM controller 216. In addition, when arbitration is complete wr_data on one of lines 734 is transmitted through synchronization registers 716, 718 and 722 to the shared memory. 16-bits of wr_tag information are selected from one of lines 736 to be transmitted as SRAM tag information through synchronization registers 722, 724 and 726.

In the preferred embodiment, a fully pipelined SRAM that supports zero bus turn around is used as shared memory. Therefore, no latency will occur when a read cycle follows a write cycle. This allows second level arbiter/scheduler 214 to schedule requests in any sequence. In one embodiment, second level arbiter/scheduler 214 schedules read requests together followed by write requests. In this embodiment, if a memory device is used that suffers performance degradation in alternating between read and write transactions, that degradation is minimized.

Figure 8:
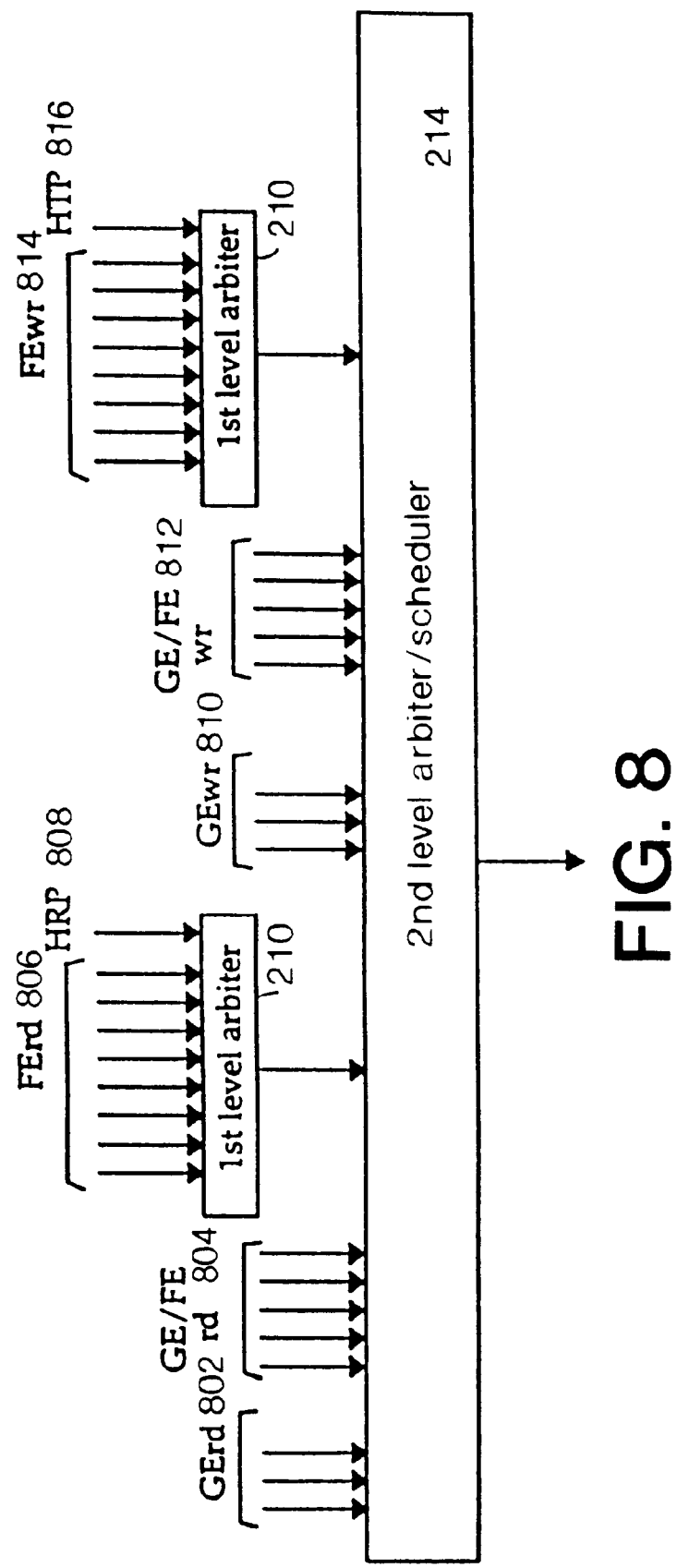
FIG. 8 is a diagram of multilevel arbitration according to one embodiment of the invention.

FIG. 8 is a simplified diagram of two level arbitration for access to the shared memory according to one embodiment. In this embodiment, read requests and write requests are supported from the following ports: three fast ports 222; five configurable ports 220; eleven slow ports 202 and one host port 204. As shown in FIG. 8, first level arbiter 210 and second level arbiter/scheduler 214 handle read requests and write requests from fast and slow ports, in this figure labeled as gigabit Ethernet (GE), and Fast Ethernet (FE). FE read (FErd) request signals 806 and host read process (HRP) request signal 808 are arbitrated in a round robin fashion by first level read arbiter 210b. As a result of that arbitration, a single FErd request is fed to second level arbiter/scheduler 214. Second level arbiter/scheduler 214 arbitrates between the results of the arbitration performed by first level arbiter 210b, three GE read (GErd) requests 802, and five configurable GE/FE read (GE/FErd) requests 804. Two level arbitration for write requests is handled in a similar fashion. As shown, first level write arbiter 210a arbitrates between FE write (FEwr) requests 814 and a host transmit process (HTP) request 816. Second level arbiter/scheduler 214 arbitrates between the results of the arbitration performed by first level arbiter 210a and GE write (GEwr) requests 810 and GE/FE write (GE/FEwr) requests 812. In this way memory bandwidth is optimized and resources are conserved.

In the embodiment shown in FIG. 8, requests to access the shared memory are scheduled in order as shown from left to right, with read requests first in time followed by write requests. This arrangement minimizes wait states for memories that incur wait states when alternating between read and write accesses. Other embodiments arrange the order of reads and writes in other ways and still benefit from the increased efficiency of the two level arbitration scheme.

Although the present invention has been described in terms of specific exemplary embodiments, it will be appreciated that various modifications and alterations might be made by those skilled in the art without departing from the spirit and scope of the invention as set forth in the following claims.

What is claimed is:

1. An apparatus for managing a buffer memory in a packet switch that is shared between multiple ports in a network system, comprising:

a plurality of slow data port interfaces configured to transmit data at a first data rate between a slow data port and the buffer memory;

a plurality of fast data port interfaces configured to transmit data at a second data rate between a fast data port and the buffer memory;

a first level arbiter coupled to the plurality of slow data port interfaces configured to choose an access request of one the slow data ports and output the access request; and a second level arbiter coupled to the plurality of fast data port interfaces and to the output of the first level arbiter configured to choose an access request from among a plurality access requests from the fast data port interfaces and the access request from the first level arbiter to be serviced by the buffer memory.

2. The apparatus of claim 1, wherein the first level arbiter comprises:

a first level write arbiter circuit, comprising:
an arbitration circuit configured to receive a plurality of memory write access requests from a plurality of slow data ports and transmit a write grant signal to one of the slow data ports;
a command multiplexor configured to receive a plurality of command words from the plurality of slow data ports and output one of the command words in response to a signal from the arbitration circuit; and
a data multiplexor configured to receive at least one segment of at least one data word from the plurality of slow data ports and output a segment of a data word in response to a signal from the arbitration circuit.

3. The apparatus of claim 2, wherein the first level write arbiter further comprises:

load circuitry configured to receive the command word; and accumulation circuitry wherein sequential segments of data are received from the data multiplexor and accumulated in response to a signal from the load circuitry to form a data word, a tag word, and a write address from one of the plurality of slow data ports.

4. The apparatus of claim 3, wherein the accumulation circuitry outputs the accumulated data word from a first data register in parallel to the memory and simultaneously accumulates a second data word in sequential segments in a second data register.

5. The apparatus of claim 4, wherein the segment of data is 16 bits wide and wherein the data word is 128 bits wide.

6. The apparatus of claim 2, wherein the first level arbiter further comprises a first level read arbiter circuit comprising:

an arbitration circuit configured to receive a plurality of memory read access requests from a plurality of slow data ports and transmit a read grant signal to one of the slow data ports; and a read address multiplexor configured to receive a plurality of read addresses from the plurality of slow data ports and transmit one of the plurality of read addresses to the memory in response to a signal from the arbitration circuit.

7. The apparatus of claim 1, wherein the second level arbiter comprises:

an arbitration circuit configured to receive the plurality of access requests from the fast data port interfaces, including read and write access requests and the access request from the first level arbiter, including a read request and a write request, and output a read grant signal, a write grant signal, and memory control signals to a memory controller; and a plurality of multiplexors configured to receive information from the fast data port interfaces and the first level arbiter and output information in response to signals from the arbitration circuit.

8. The apparatus of claim 7, wherein the information received by the plurality of multiplexors includes data information, address information, and tag information and wherein the plurality of multiplexors output information associated with a port whose access request is granted by the arbitration circuit.

9. The apparatus of claim 8, wherein the second level arbiter further comprises an address multiplexor configured to receive a read address and a write address and output the read address or the write address in response to a signal from the arbitration circuit.

10. The apparatus of claim 9, wherein the second level arbiter further comprises pipeline registers configured to store data and tag information to be written to the memory.

11. The apparatus of claim 1, wherein the slow data ports transmit data at a rate of 100 Mbps and wherein the fast data ports transmit data at ten times the rate of the slow data ports.

12. A method for controlling access to a shared resource in a network by network clients operating at different data rates, comprising the steps of:

receiving an access request from at least one slow client configured to operate at a first data rate;

receiving an access request from at least one fast client configured to operate at a second data rate;

arbitrating among access requests of slow clients to select a slow client access request; and arbitrating among access requests of fast clients and the slow client access request to select an access request to be serviced by the shared resource.

13. The method of claim 12, wherein the step of receiving an access request from the slow client includes the steps of:

receiving a slow write access request; and receiving command bits, write data, and a write address associated with the slow write access request.

14. The method of claim 13, further comprising the step of, when the slow write access request is granted, using the command bits to identify an area of a storage location that is shared among the slow clients for storing the write data and the write address.

15. The method of claim 14, wherein the step of receiving an access request from the fast client includes the steps of:

receiving a fast write access request; and receiving command bits, write data, and a write address associated with the fast write access request.

16. The method of claim 15, further comprising the steps of:

when the fast write access request is granted, using the command bits to assemble the write data and the write address in a storage area associated with a fast client; and writing the assembled write data and write address to the shared resource.

* * * * *